US008638804B2

(12) United States Patent
Diab et al.

(10) Patent No.: US 8,638,804 B2
(45) Date of Patent: Jan. 28, 2014

(54) METHOD AND SYSTEM FOR RECOGNIZING ENERGY EFFICIENT CERTIFIED DEVICES THROUGH A GATEWAY

(75) Inventors: Wael William Diab, San Francisco, CA (US); Jeyhan Karaoguz, Irvine, CA (US); Xuemin Chen, Rancho Santa Fe, CA (US); David Garrett, Tustin, CA (US); David Lundgren, Mill Valley, CA (US); Rich Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 269 days.

(21) Appl. No.: 12/981,993

(22) Filed: Dec. 30, 2010

(65) Prior Publication Data

US 2011/0299541 A1 Dec. 8, 2011

Related U.S. Application Data

(60) Provisional application No. 61/351,696, filed on Jun. 4, 2010.

(51) Int. Cl.
*H04L 12/28* (2006.01)

(52) U.S. Cl.
USPC ............ 370/401; 370/331; 370/389; 709/224

(58) Field of Classification Search
USPC ............................ 370/331, 389, 401; 709/224
See application file for complete search history.

(56) References Cited

U.S. PATENT DOCUMENTS

| | | | |
|---|---|---|---|
| 5,927,598 A * | 7/1999 | Broe ........................... 236/46 R |
| 6,487,509 B1 * | 11/2002 | Aisa ................................ 702/62 |
| 6,535,580 B1 * | 3/2003 | Strauss et al. .............. 379/27.01 |
| 7,130,616 B2 * | 10/2006 | Janik ........................... 455/412.1 |
| 7,142,560 B2 * | 11/2006 | Mansfield ..................... 370/466 |
| 7,394,819 B2 * | 7/2008 | Chen et al. ..................... 370/401 |
| 7,484,110 B2 * | 1/2009 | Stufflebeam .................. 713/300 |
| 7,912,943 B2 * | 3/2011 | Maki ............................. 709/224 |
| 2001/0025349 A1 * | 9/2001 | Sharood et al. ............... 713/340 |
| 2002/0073434 A1 * | 6/2002 | Pience ........................... 725/119 |
| 2003/0004961 A1 * | 1/2003 | Slothouber et al. ........... 707/100 |
| 2003/0217110 A1 * | 11/2003 | Weiss ............................ 709/207 |
| 2003/0233201 A1 * | 12/2003 | Horst et al. ..................... 702/62 |
| 2004/0242230 A1 * | 12/2004 | Rue ................................ 455/433 |
| 2006/0142961 A1 * | 6/2006 | Johnson et al. ................. 702/61 |
| 2006/0150241 A1 * | 7/2006 | Huh et al. ......................... 726/4 |
| 2007/0223465 A1 * | 9/2007 | Wang et al. .................... 370/356 |
| 2008/0172312 A1 * | 7/2008 | Synesiou et al. ................ 705/34 |
| 2009/0157529 A1 * | 6/2009 | Ehlers et al. .................... 705/26 |
| 2010/0017242 A1 * | 1/2010 | Hamilton et al. ................. 705/8 |

(Continued)

*Primary Examiner* — Andrew Lai
*Assistant Examiner* — Andrew C Lee
(74) *Attorney, Agent, or Firm* — Thomas|Horstemeyer, LLP.

(57) ABSTRACT

A broadband gateway, which enables communication with a plurality of devices, may be operable to identify an energy efficient certified device from the plurality of devices. The broadband gateway may handle at least one physical layer connection to at least one corresponding network access service provider. Information related to the identified energy efficient certified device, including usage information of the device, may be communicated to one or more entities. The broadband gateway may acquire the usage information of the energy efficient certified device by monitoring whether the device is operating in an energy efficient mode. The broadband gateway may obtain a credit and/or a reward from the one or more entities based on the usage information of the energy efficient certified device. The broadband gateway may deposit the credit and/or the reward to an account associated with the energy efficient certified device.

20 Claims, 7 Drawing Sheets

(56) References Cited

U.S. PATENT DOCUMENTS

| | | | |
|---|---|---|---|
| 2010/0076615 A1* | 3/2010 | Daniel et al. | 700/293 |
| 2010/0217651 A1* | 8/2010 | Crabtree et al. | 705/10 |
| 2011/0001833 A1* | 1/2011 | Grinkemeyer et al. | 348/192 |
| 2011/0029659 A1* | 2/2011 | Shah | 709/224 |
| 2011/0116482 A1* | 5/2011 | Ansari | 370/338 |
| 2011/0163676 A1* | 7/2011 | Farzan et al. | 315/125 |
| 2011/0176463 A1* | 7/2011 | Cowan et al. | 370/311 |
| 2011/0202910 A1* | 8/2011 | Venkatakrishnan et al. | 717/171 |

* cited by examiner

METHOD AND SYSTEM FOR RECOGNIZING ENERGY EFFICIENT CERTIFIED DEVICES THROUGH A GATEWAY

CROSS-REFERENCE TO RELATED APPLICATIONS/INCORPORATION BY REFERENCE

This patent application makes reference to, claims priority to, and claims benefit from U.S. Provisional Application Ser. No. 61/351,696, which was filed on Jun. 4, 2010.

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981/971 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,753 filed on Dec. 30, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for recognizing energy efficient certified devices through a gateway.

BACKGROUND OF THE INVENTION

Telecommunication technologies have evolved from analog to digital technologies, and continue to evolve from circuit switched to packet switched, from connection oriented packet switching to connectionless packet switching, and from narrow band applications to broadband applications. The accompanied evolution in telecommunication technologies has significantly advanced operators' capability to offer broadband, IP-based multimedia services ranging from entertainment and lifestyle applications such as mobile TV and mobile payment to professional services such as video conferencing and real-time data exchange.

With the continuous growth of digital television or broadcast multimedia and/or broadband access, which may be used in conjunction with online businesses, social networks, and/or or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more display devices that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcasts, service providers may require use of dedicated equipment such as set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for recognizing energy efficient certified devices through a gateway, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
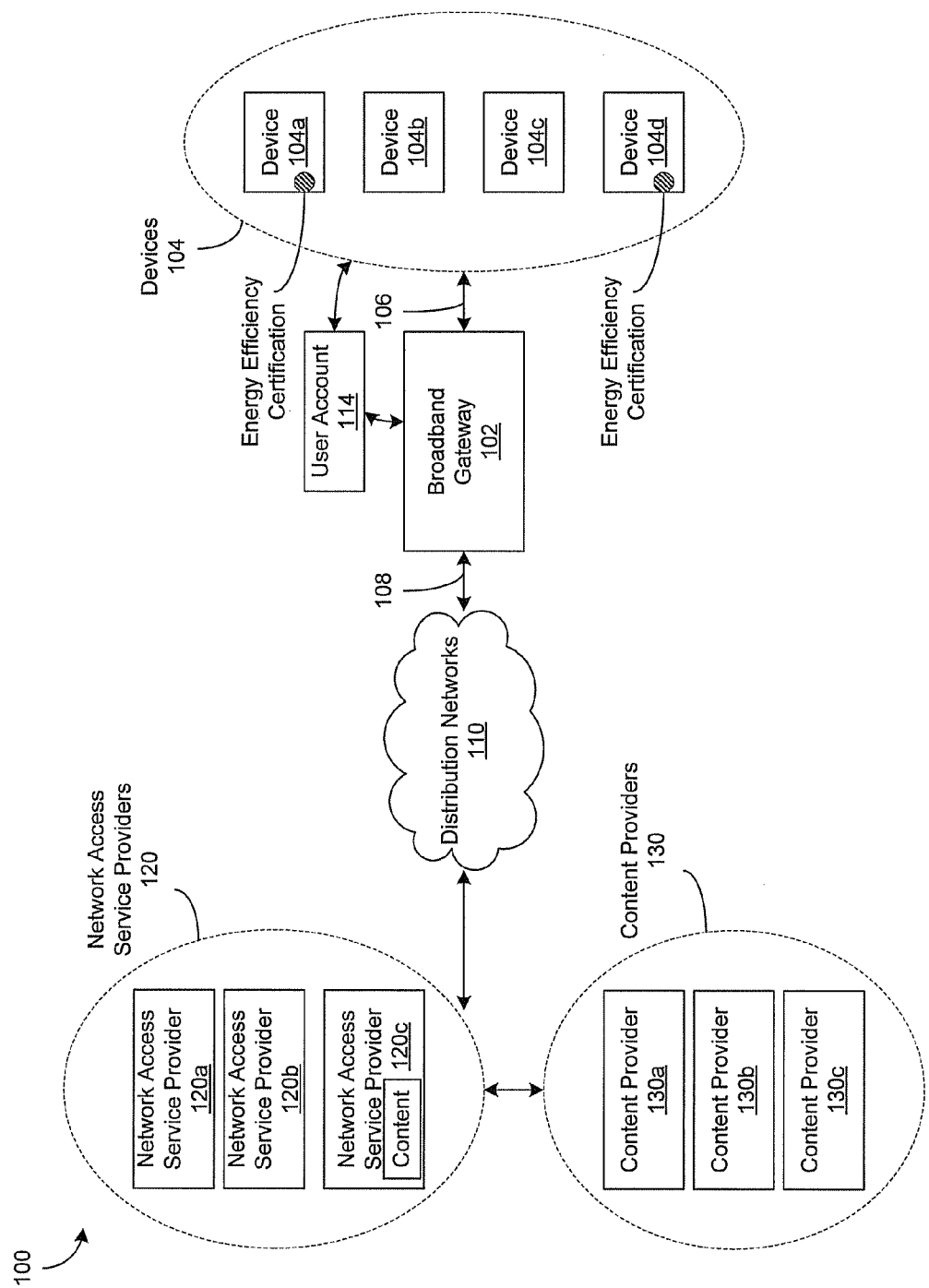
FIG. 1A is a block diagram illustrating an exemplary communication system that is operable to recognize energy efficient certified devices through a gateway, in accordance with an embodiment of the invention.

Certain embodiments of the invention can be found in a method and system for recognizing energy efficient certified devices through a gateway. In various embodiments of the invention, a broadband gateway, which enables communication with a plurality of devices and handles at least one physical layer connection to at least one corresponding network access service provider, may be operable to identify an energy efficient certified device from the plurality of devices. Information related to the identified energy efficient certified device may be communicated to one or more entities such as a service provider, utility company, or government agency. The information related to the energy efficient certified device may comprise, for example, usage information of the energy efficient certified device, capabilities and/or capacities of the energy efficient certified device, and/or user information of the energy efficient certified device. In this regard, the broadband gateway may acquire the usage information of the energy efficient certified device by monitoring whether the energy efficient certified device is operating in an energy efficient mode, for example. In an exemplary embodiment of the invention, the identified energy efficient certified device may comprise an energy efficient device that is certified by one or more governmental agencies and/or one or more other entities that may be approved or have authority to certify devices as being energy efficiency compliant. In an exemplary embodiment of the invention, an identified energy efficient certified device may be, for example, an energy star certified device and/or a California energy efficient device.

The at least one physical layer connection may comprise, for example, a plurality of physical layer connections and the at least one corresponding network access service provider may comprise a plurality of corresponding network access service providers. In this regard, each of the plurality of physical layer connections may correspond to a respective one of the plurality of corresponding network access service providers.

In an exemplary embodiment of the invention, the broadband gateway may be operable to obtain a credit and/or a reward from the one or more entities based on the usage information of the energy efficient certified device. The credit and/or the reward may be deposited or credited by the broadband gateway to an account associated with the energy efficient certified device.

During interactions and/or communications between the broadband gateway and the energy efficient certified device for the identification for the energy efficient certified device, the broadband gateway may be operable to utilize one or more specific protocols. In this regard, the one or more specific protocols may comprise, for example, one or more device discovering protocols, one or more signaling protocols, one or more control protocols and/or one or more messaging protocols.

In an exemplary embodiment of the invention, the one or more entities may manage generation and/or distribution of power in a power grid.

FIG. 1A is a block diagram illustrating an exemplary communication system that is operable to recognize energy efficient certified devices through a gateway, in accordance with an embodiment of the invention. Referring to FIG. 1A, there is shown a communication system 100. The communication system 100 may comprise a broadband gateway 102, a plurality of distribution networks 110, a plurality of devices 104 of which devices 104a-104d are illustrated, a plurality of network access service providers 120 of which network access service providers 120a-120c are illustrated and a plurality of content providers 130 of which content providers 130a-130c are illustrated. The devices 104a-104d may be serviced by the broadband gateway 102.

A content provider such as the content provider 130a may comprise suitable logic, circuitry, interfaces and/or code that may be operable to generate, capture and/or package content such as, for example, multimedia content that may be distributed to one or more of the devices 104a-104d via one or more of the network access service providers 120a-120c and the broadband gateway 102. The content may be, for example, downloadable or streaming, and/or rented or purchased.

A network access service provider such as the network access service provider 120a may comprise suitable logic, circuitry, interfaces and/or code that may be operable to provide services using different access technologies to one or more of the devices 104a-104d for end-users via the broadband gateway 102. The services may include, but are not limited to, multimedia, television, Internet, phone, Ethernet, multimedia over coax alliance (MoCA), passive optical network (PON), and/or cellular services, for example. The network access service providers 120a-120c may provide physical layer connections to the broadband gateway 102. Such physical layer connections may then be utilized by the broadband gateway 102 to access content provided by the content providers 130, to access services provided by other service providers, and/or to access an intranet or the Internet at-large. In this regard, "network access service provider" as utilized herein, is distinguished from the more generic term "service provider" which may encompass services other than providing physical layer access. Cable television (CATV) providers, plain old telephone service (POTS) providers, digital subscriber line (DSL) providers, cellular service providers, WiMAX providers and/or satellite providers are examples of the network access service providers 120. In some instances, a network access service provider such as the network access service provider 120c may be a provider that provides both content and services.

The broadband gateway 102 may comprise suitable logic, circuitry, interfaces and/or code that may be operable to provide an interface and connectivity between one or more of the devices 104a-104d and one or more of the distribution networks 110. For example, the broadband gateway 102 may support configuring and/or using a plurality of broadband connections 108 to the distribution networks 110. The broadband connections 108 may comprise wired and/or wireless connections between the broadband gateway 102 and the distribution networks 110. In this regard, the broadband gateway 102 may be operable to perform and/or provide various services that may pertain to enabling and/or facilitating reception of content such as multimedia content from one or more of the content providers 130a-130c. The content may be delivered through one or more of the network access service providers 120a-120c. The broadband gateway 102 may communicate with various devices 104a-104d using wired, optical and/or wireless communication links 106.

A single broadband gateway such as the broadband gateway 102 may be operable to handle a plurality of physical layer connections to the distribution networks 110, where different ones or portions of the distribution networks 110 may be owned, operated, leased or associated with different ones of the network access service providers 120. A physical layer may refer to an open systems interconnection (OSI) layer 1. In this regard, for example, a first network access service provider such as the network access service provider 120a may provide network access to the broadband gateway 102 via a DSL connection over twisted-pair cabling, and a second network access service provider such as the network access service provider 120b may provide network access to the broadband gateway 102 via a cable television connection over coaxial cabling. In some instances, the broadband gateway 102 may be operable to concurrently communicate over the plurality of physical layer connections provided by the plurality of network access service providers 120a-120c.

The broadband gateway 102 may be located at a residential location such as a home. The broadband gateway 102 may also be located in non-residential location comprising, for example, a commercial building, an office, an office complex, an apartment building and/or a factory. While the broadband gateway 102 may be illustrated as a single and separate device in FIG. 1A, the invention may not be so limited. In one embodiment of the invention, some functionalities of the broadband gateway 102 may be implemented in a distributed manner over two or more devices locally and/or remotely. For example, some of the functionalities of the broadband gateway 102 may be implemented within one of the televisions available in the home. Furthermore, the broadband gateway 102 may be implemented as a virtual platform, for example.

In various embodiments of the invention, the broadband gateway 102 may be operable to provide energy efficient management for the devices 104a-104d. The broadband gateway 102 may be utilized to provide energy efficient service delivery to the devices 104a-104d. The broadband gateway 102 may be operable to recognize an energy efficient certified device such as the device 104a. In this instance, the broadband gateway 102 may provide that information, for example, to a service provider that collects energy consumption information and statistics and, in turn, reports the information to a governmental agency and/or to a utility company that supplies energy to the location of the gateway 102 and devices 104. The broadband gateway 102, or owner thereof, may obtain rewards and/or credits based on the usage of such certified device 104a. For example, the service provider may credit a bill associated with the gateway 102, the utility company may credit a utility bill of the location in which the gateway 102 resides, and/or the governmental agency may provide a tax rebate to an owner of the gateway 102 and the devices 104.

A device such as the device 104a may comprise suitable logic, circuitry, interfaces and/or code that may be operable to interact with the broadband gateway 102. The devices 104a-104d serviced by, and/or connected with the broadband gateway 102 may comprise content consuming devices and/or non-content consuming household devices. For example, the devices 104 may comprise a television, a set-top box (STB), a laptop computer, a smoke detector, a carbon monoxide detector, a security alarm, a desk top computer and/or server, a mobile phone, a speaker, an AM/FM radio, a phone, and/or an appliance such as a refrigerator. The devices 104a-104d may interact with the broadband gateway 102 via the links 106 utilizing various wired and/or wireless communication technologies such as, for example, Bluetooth, LTE, WiFi and/or Ethernet. One or more of the devices such as the devices 104a, 104d may be energy efficient certified devices. An energy efficient certified device such as the device 104a may be a device that meets certain energy efficiency standards or specifications promulgated or stipulated by a particular entity.

In the exemplary embodiment of the invention illustrated in FIG. 1A, although the devices 104a-104d communicate with only the broadband gateway 102 as shown, the invention may not be so limited. Accordingly, the devices 104a-104d may communicate with multiple broadband gateways in a local or home network without departing from the spirit and scope of various embodiments of the invention.

The distribution networks 110 may comprise suitable logic, circuitry, communication devices, interfaces and/or code that may be operable to enable wireless and/or wired communication among a plurality of local and/or remote entities, based on one or more networking and/or communication infrastructures. In this regard, one or more of the distribution networks 110 may be utilized to enable distribution of content such as multimedia content generated by one or more of the content providers 130a-130c, via one or more of the network access service providers 120a-120c, to one or more of the devices 104a-104d. The network connectivity available via the distribution networks 110 may be based on one or more communication standards and/or protocols. The distribution networks 110 may comprise, for example, Internet, cable television (CATV) network, satellite television (TV) network, wired or wireless local area network (LAN), wired or wireless wide area network (WAN), personal area network (PAN) and/or cellular network.

In operation, the broadband gateway 102 may be operable to identify or recognize an energy efficient certified device such as the device 104a from the plurality of devices 104. The energy efficient certified device 104a may be a device that meets certain energy efficiency standards or specifications promulgated or stipulated by a particular entity. Exemplary standards are energy star and California energy efficiency standards. Information related to the energy efficient certified device 104a may be communicated to one or more entities via one or more of the network access service providers 120a-120c.

In an embodiment of the invention, the gateway 102 information may communicate the information to a service provider that aggregates such information from multiple gateways 102 and communicates the aggregated information to other entities, such as governmental agencies and/or utility companies. The service provider that aggregates the information may authenticate the information, reformat the information, filter the information, generate statistics from the information, and/or otherwise process the information. For example, the service provider may remove portions of the information that may reveal personal and/or sensitive information regarding the location and/or users/owners of the gateway 102. In such an embodiment of the invention, the service provider may be enabled to prevent entities, such as a utility company or governmental agency from seeing information that may be regarded as sensitive to the owners and/or users of the gateway 102 and/or devices 104.

In an embodiment of the invention, the gateway 102 may communicate the information directly to an entity, such as a utility company and/or governmental agency that makes use of the energy-related information. In such an embodiment, the information may, for example, be encrypted while being communicated to the entity, thus preventing any intermediate devices and/or networks from accessing information that an owner and/or user of the gateway 102 and/or the devices 104 may regard as sensitive.

In an embodiment of the invention, the gateway 102 may strip, modify, and/or encrypt sensitive energy-related information prior to communicating the information to a service provider that aggregates energy-related information and/or to an entity, such as utility company or governmental agency that utilizes the energy-related information.

The information related to the energy efficient certified device 104a may comprise, for example, usage information of the device 104a, capabilities and/or capacities of the device 104a, and/or user information of the device 104a. The usage information may comprise, for example, actual hours in a day that the device 104a is used and/or operated in an energy efficient mode. The capabilities and/or capacities of the device 104a may comprise the capabilities and/or capacities associated with, for example, content resolution, channel bandwidth and/or access securities. The user information may comprise, for example, name, address, email addresses, phone numbers and/or other contact information associated with a user account such as the user account 114. In this regard, the broadband gateway 102 may acquire the usage information of the device 104a by monitoring whether the device 104a is actually being used and/or is configured to operate in an energy efficient mode, for example. In an exemplary embodiment of the invention, the energy efficient certified device 104a may comprise an energy efficient device that is certified by one or more governmental agencies and/or one or more other entities that may be approved or have authority to certify devices as being energy efficiency compliant. In this regard, the energy efficient certified device 104a may be, for example, an energy star certified device and/or a California energy efficient device.

The energy star is an international standard for energy efficient consumer products. For example, in the United States, devices which are energy star certified and are carrying the energy star logo generally use 20%-30% less energy than is required by current federal standards. A California energy efficient device is a device that meets the California energy efficiency standards.

In an exemplary embodiment of the invention, a user account, such as the user account 114, associated with the gateway 102 and/or energy efficient certified device 104a may be credited based on energy-related information collected by the gateway 102 and communicated to the entity. The gateway 102 may additionally handle one or more communications to receive the credit and apply the credit to the user account 114. For example, based on the monthly energy savings due to use of the device 104a in an energy efficient mode, a utility company may send a credit or a reward to the gateway 102, the gateway 102 may determine that the credit is associated with device 104a, and the gateway 102 may add the credit to the account 114 associated with the device 104a.

Interactions and communications between the broadband gateway 102 and the devices 104 for the purpose of identifying energy efficient certified devices and collecting energy-related information may utilize one or more specific protocols. In this regard, the one or more specific protocols may comprise, for example, one or more device discovering protocols, one or more signaling protocols, one or more control protocols and/or one or more messaging protocols. Similarly, communications of energy-related information between the gateway 102 and one or more of: a service provider that aggregates energy-related information, a utility company, and a governmental agency, may utilize a specific protocol.

Figure 1B:
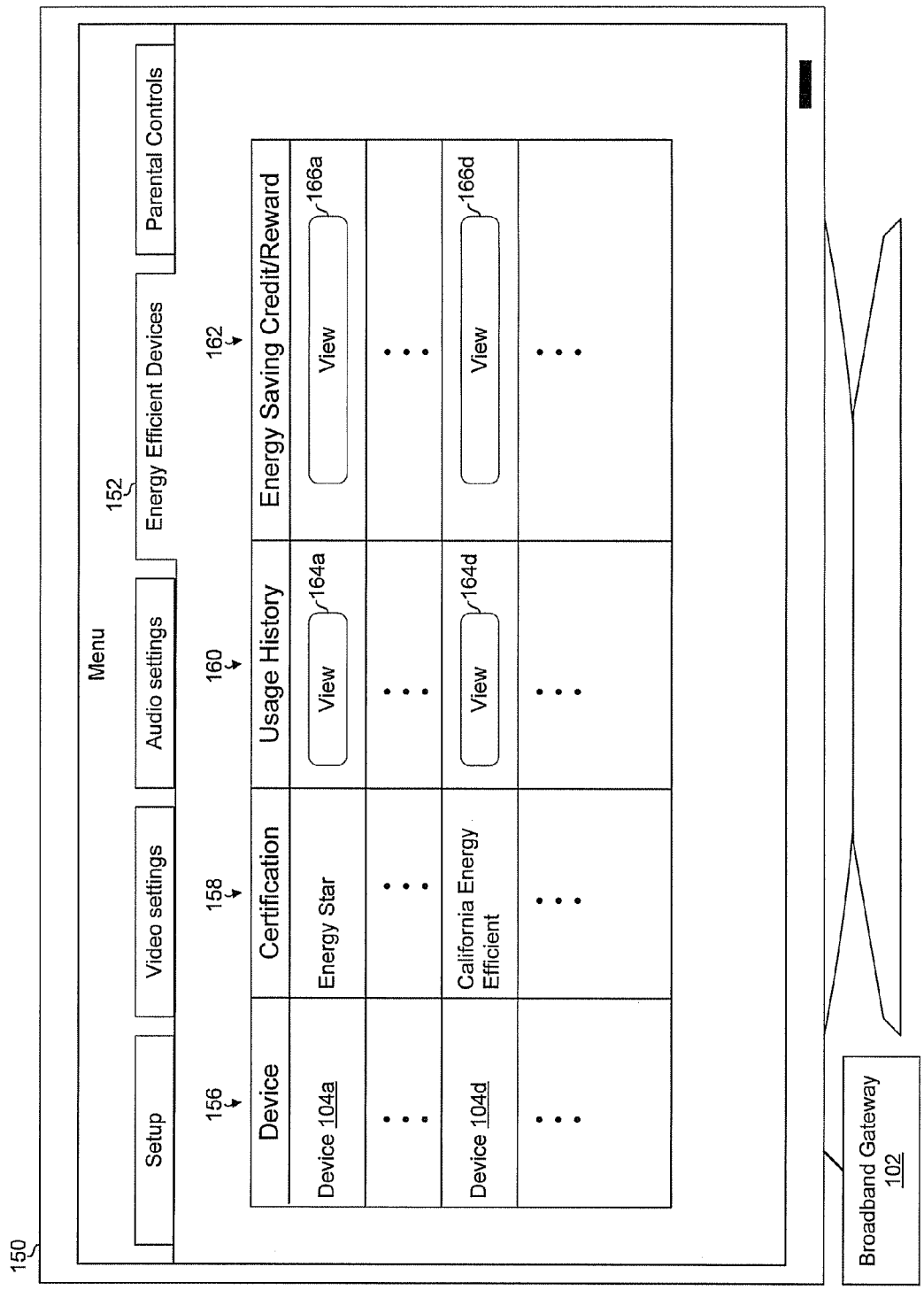
FIG. 1B is a block diagram illustrating an exemplary graphical user interface (GUI) that provides energy saving credit/reward information associated with energy efficient certified devices, in accordance with an embodiment of the invention.

FIG. 1B is a block diagram illustrating an exemplary graphical user interface (GUI) that provides energy saving credit/reward information associated with energy efficient certified devices, in accordance with an embodiment of the invention. Referring to FIG. 1B, there is shown a graphical user interface (GUI) 150. The GUI 150 generated by the broadband gateway 102 may be displayed, for example, on a display device such as a television for an associated user account such as the user account 114.

In FIG. 1B, an energy efficient devices tab 152 of the GUI 150 is selected. Displayed in the energy efficient devices tab 152 is a table displaying related information associated with energy efficient certified device(s). A column 156 of the table may comprise one or more identified energy efficient certified devices of which the devices 104a, 104d are illustrated. A column 158 of the table may comprise energy efficient certification information. For example, the column 158 may indicate that the device 104a is an energy star certified device and the device 104d is a certified California energy efficient device.

A column 160 may comprise view controls 164a, 164d for viewing usage history information associated with the displayed energy efficient certified devices. For example, upon selection of a view control such as the view control 164a, a window displaying the usage history information associated with the device 104a may be displayed. The usage history information associated with the device 104a may comprise, for example, actual hours within a period such as a month that the device 104a is used and/or operated in an energy efficient mode. A column 162 may comprise view controls 166a, 166d for viewing energy saving credit/reward information associated with the displayed energy efficient certified devices. For example, upon selection of a view control such as the view control 166a, a window displaying the energy saving credit/reward information, which may be based on the corresponding usage history information associated with the device 104a, may be displayed. In this regard, for example, the displayed energy saving credit/reward information may indicate that, based on a monthly energy savings due to the actual usage of the device 104a in the energy efficient mode, a credit or a reward from a content provider such as the content provider 130a may be offered to the user account 114 of the device 104a.

Figure 1C:
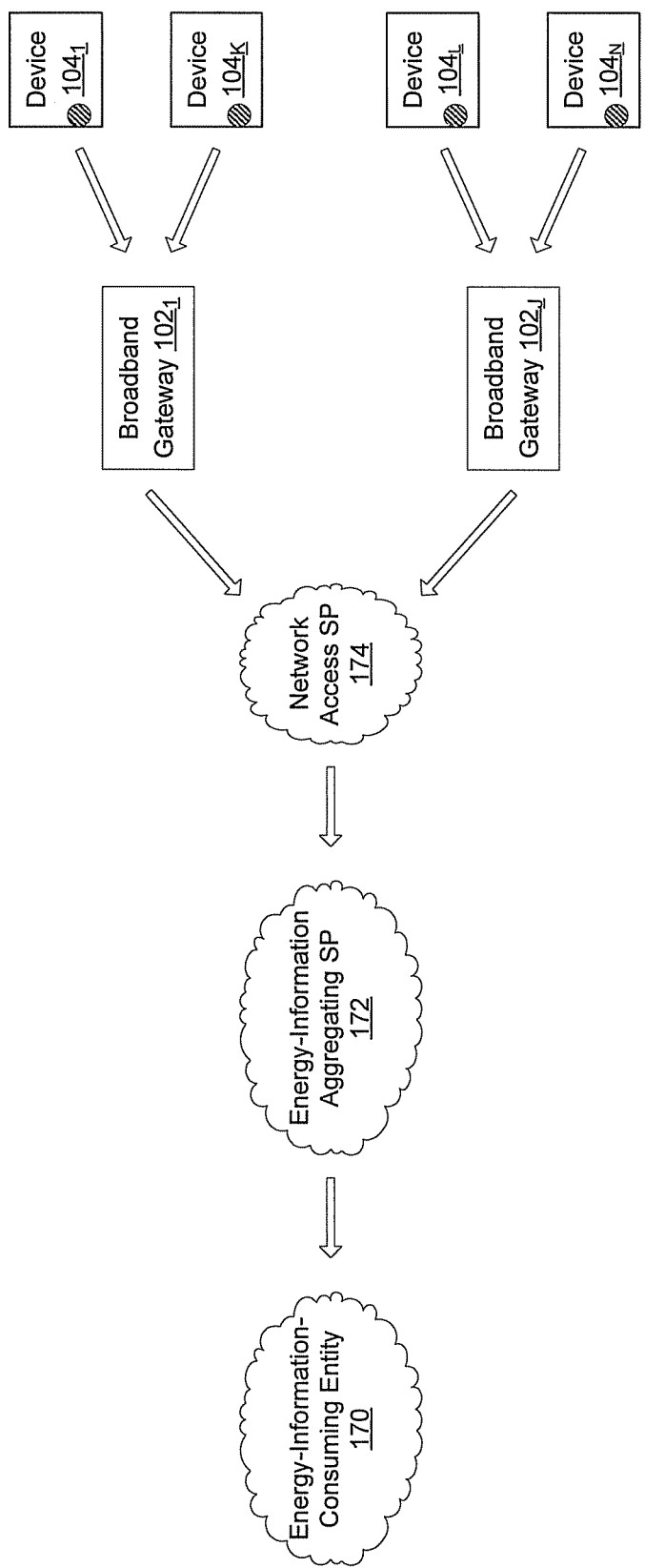
FIG. 1C is a block diagram illustrating communication of energy-related information to a service provider that aggregates such information and removes confidential and/or sensitive portions of such information, in accordance with an embodiment of the invention.

FIG. 1C is a block diagram illustrating communication of energy-related information to a service provider that aggregates such information and removes confidential and/or sensitive portions of such information, in accordance with an embodiment of the invention. Referring to FIG. 1C, there is shown gateways $102_1$ and $102_J$ (gateways $102_2$-$102_{J-1}$ and their corresponding devices 104 not shown), devices $104_1$-$104_K$ coupled to a gateway $102_1$, devices $104_L$-$104_N$ coupled to a gateway $102_J$, network access service provider (SP) 174, service provider (SP) 172, and entity 170.

Each of the gateways $102_1$-$102_J$ may be substantially similar to the gateway 102 described above. Each of the devices $104_1$-$104_K$ and $104_L$-$104_N$ may be substantially similar to any of the devices 104a-104d described above. The network access service provider (SP) 174 may be substantially similar to any of the network access service providers 120a-120c described above.

The entity 170 may comprise, for example, a government agency and/or utility company. In an exemplary embodiment of the invention, the entity 170 may manage a "smart" power grid. In this regard, the entity 170 may, for example, control how much power is generated and/or distributed, and where power is generated and/or distributed. For example, the entity 170 may enable and disable portions of one or more substations based on the energy needs of locations served by those substations.

The service provider (SP) 172 may comprise suitable logic, circuitry, interfaces, and/or code for receiving energy related information from the network access service provider (SP) 174, and possibly other network access service providers (not shown). The service provider (SP) 172 may be operable to aggregate energy-related information received from various devices, gateways, and/or service providers, process the received information, and communicate the results of the processing to the entity 170.

The processing performed by the SP 172 may comprise, for example, generating statistics based on the received energy-related information. For example, statistics such as number of energy efficient certified devices in use, percentage of energy efficient certified devices that are actually used in a power-saving manner, and average power-savings resulting from the use of energy efficient certified devices.

The processing performed by the SP 172 may also comprise stripping out portions of the received information that may be identifying, confidential and/or otherwise considered sensitive by users and/or owners of the gateways $102_1$-$102_J$ and/or devices $104_1$-$104_N$. In this regard, the SP 172 may prevent the entity 170 from determining an identity of users and/or devices associated with particular energy-related information.

In an embodiment of the invention, it may be desired that even the SP 172 not be able to associate particular energy-related information with particular users and/or devices. In such an embodiment, the gateways $102_1$-$102_J$ may perform such stripping of identifying, confidential and/or otherwise sensitive information.

In an embodiment of the invention, the energy-related information may be communicated securely between any two of a device such as the device $104_1$, a gateway such as the gateway $102_1$, the network access SP 174, the SP 172, and the entity 170. For example, energy-related information may be communicated over a first security association between the gateway $102_1$ and the SP 172. As a result, the energy-related information may be incoherent to the network access SP 174 as it traverses the network access SP 174. The first security association may also enable the SP 172 and gateways $102_1$-$102_J$ to authenticate energy-related information such that credits are correctly determined and credited to the proper accounts. Additionally, energy-related information may be communicated over a second security association between the network access SP 174 and the entity 170. As a result, energy-related information may be incoherent to the network access SP 174 as it traverses the network access SP 174. The second security association may also enable the entity 170 and the SP 172 to authenticate energy-related information such that credits are correctly determined and credited to the proper accounts.

Figure 1D:
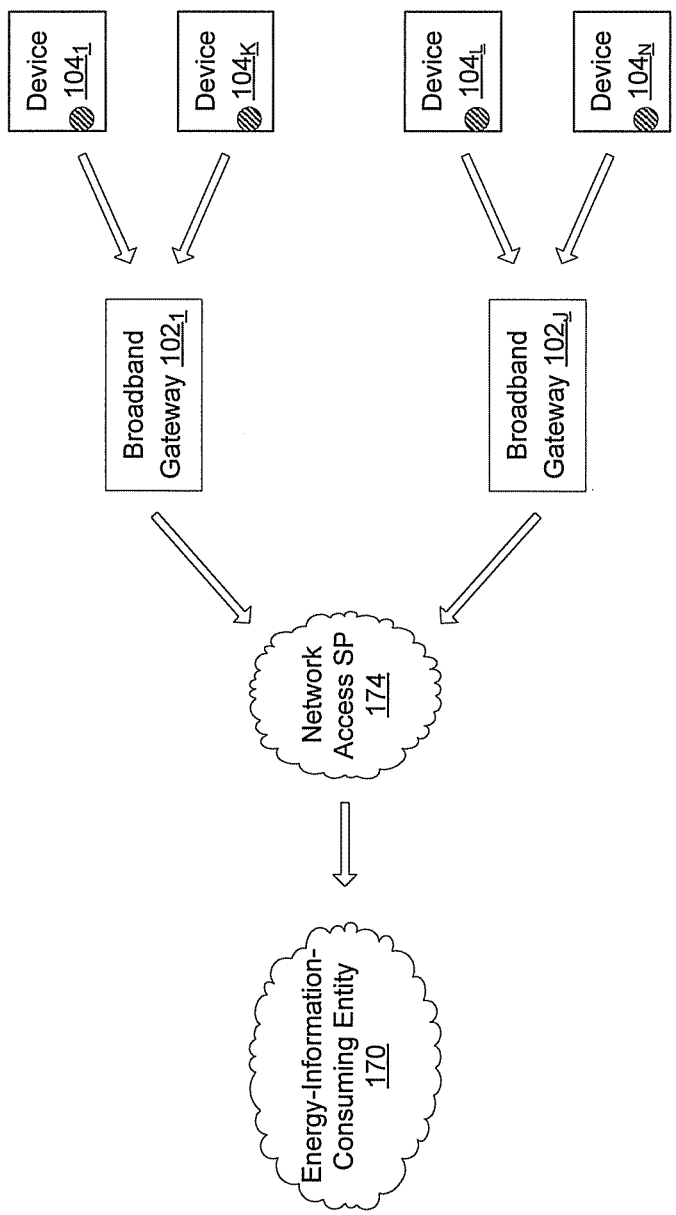
FIG. 1D is a block diagram illustrating communication of energy-related information to an entity that utilizes such information, in accordance with an embodiment of the invention.

FIG. 1D is a block diagram illustrating communication of energy-related information to an entity that utilizes such information, in accordance with an embodiment of the invention. FIG. 1D is similar to FIG. 1C with the exception that the aggregation and other processing of the energy-related information may be performed by the entity 170 rather than the SP 172.

In an embodiment of the invention, the energy-related information may be communicated securely between any two of a device such as the device $104_1$, a gateway such as the gateway $102_1$, the network access SP 174, and the entity 170. For example, energy-related information may be communicated over a first security association between the gateway $102_1$ and the entity 172 such that information is incoherent to the network access SP 174 as it traverses the network access SP 174. The security association may also enable the entity 170 and gateways $102_1$-$102_J$ to authenticate energy-related information such that credits are correctly determined and credited to the proper accounts.

Figure 2:
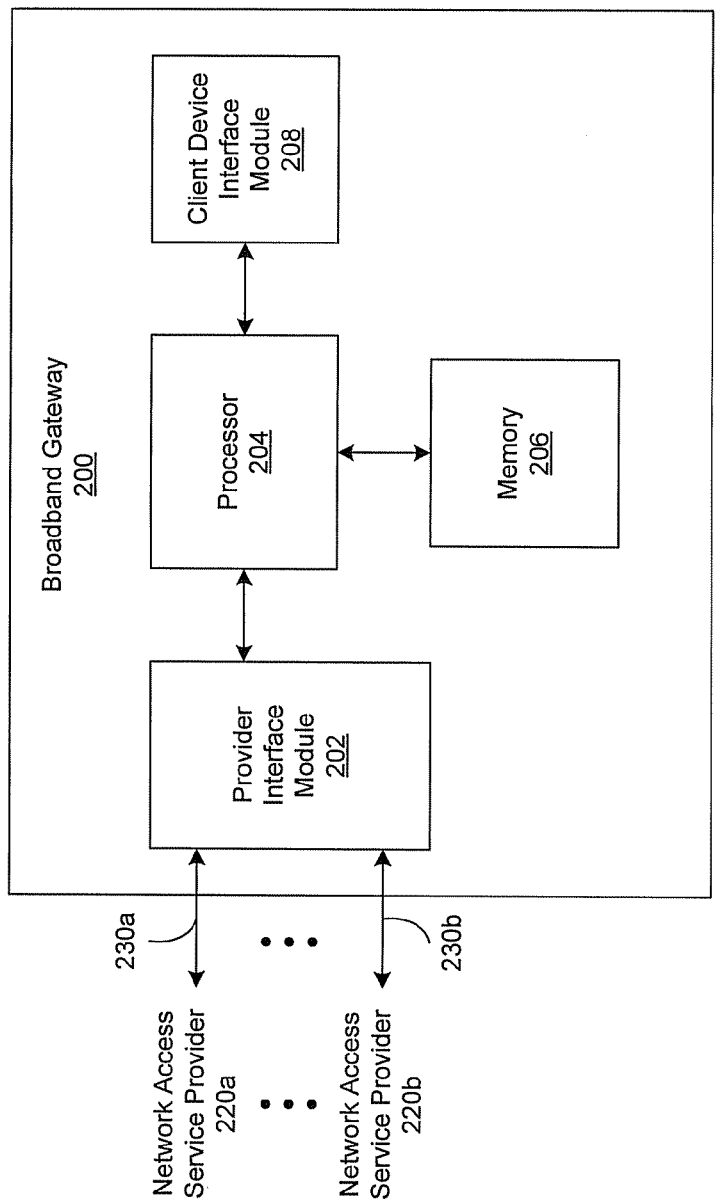
FIG. 2 is a block diagram illustrating an exemplary broadband gateway that is operable to recognize energy efficient certified devices through the gateway, in accordance with an embodiment of the invention.

FIG. 2 is a block diagram illustrating an exemplary broadband gateway that is operable to recognize energy efficient certified devices through the gateway, in accordance with an embodiment of the invention. Referring to FIG. 2, there is shown a broadband gateway 200. The broadband gateway 200 may comprise a provider interface module 202, a processor 204, a memory 206 and a client device interface module 208.

The provider interface module 202 may comprise suitable logic, circuitry, interfaces and/or code that may be operable to receive data from one or more network access service providers 220a-220b. The provider interface module 202 may also be operable to send data to one or more network access service providers 220a-220b. The provider interface module 202 may be operable to support multiple communication protocols, standards, and/or data transport technologies. The provider interface module 202 may be communicatively coupled to one or more network access service providers 220a-220b via one or more physical layer connections 230a-230b. In this regard, each of the physical layer connections 230a-230b may connect the broadband gateway 200 to one of different network access service providers 220a-220b. Each of the physical layer connections 230a-230b may comprise a wired, optical and/or wireless connection. For example, the physical layer connection 230a may comprise a DSL over twisted-pair connection while the physical layer connection 230b may comprise a CATV over coaxial cable connection.

The processor 204 may comprise suitable logic, circuitry, interfaces and/or code that may be operable to process data received from the network access service providers 220a-220b and/or data received from one or more of the devices 104a-104d. In this regard, the processor 204 may comprise one or more portions that are suitable to handle certain types of data such as video data and/or audio data, for example.

In an exemplary embodiment of the invention, the processor 204 may be operable to recognize or identify an energy efficient certified device such as the device 104a. In this regard, the processor 204 may provide information related to the energy efficient certified device 104a to one or more service providers and/or entities. The processor 204 may obtain rewards and/or credits associated with the use of such energy efficient certified device 104a and apply the rewards and/or credits to the proper user account(s). The processor 204 may utilize one or more specific protocols such as, for example, one or more device discovering protocols and/or other communication protocols to identify or recognize the energy efficient certified device 104a.

The memory 206 may comprise suitable logic, circuitry, interfaces and/or code that may be operable to store data utilized in the operations of the broadband gateway 200. For example, the memory 206 may be utilized to store configuration data, parameters, device information, tracking and/or monitoring information, security information, and intermediate processing data, for example. The memory 206 may comprise storage media integrated in the broadband gateway 200 and/or a removable storage device.

The client device interface module 208 may comprise suitable logic, circuitry, interfaces and/or code that may be operable to send data to one or more of the devices such as the devices 104a-104d in a local or home network. The client device interface module 208 may also be operable to receive data from one or more of the devices 104a-104d in the local or home network. The client device interface module 208 may be operable to support multiple communication protocols, standards, and/or data transport technologies.

In operation, the processor 204 may be operable to identify or recognize a device such as the device 104a that may be an energy efficient certified device. Information related to the energy efficient certified device 104a, such as, for example, usage information of the device 104a, capabilities and/or capacities of the device 104a, and/or user information of the device 104a, may be communicated to one or more network access service providers 220a-220b and/or one or more content providers 130a-130c (FIG. 1A). The processor 204 may be operable to acquire the usage information of the energy efficient certified device 104a (FIG. 1A) by monitoring or tracking whether the device 104a is actually being used and/or is configured to operate in an energy efficient mode, for example. The processors 204 may be operable to aggregate information regarding identified energy efficient certified devices and information regarding usage of the certified, and perhaps also non-certified devices, and communicate the information upstream to, for example, the SP 172 of FIG. 1C and/or the entity 170 of FIG. 1D.

In an exemplary embodiment of the invention, the processor 204 may be operable to obtain a credit and/or a reward from, for example, the entity 170. The processor 204 may be operable to determine one or more devices 104 that resulted in the credit/reward, and add the credit to an account such as the user account 114 (FIG. 1A) associated with the one or more devices 104.

Figure 3:
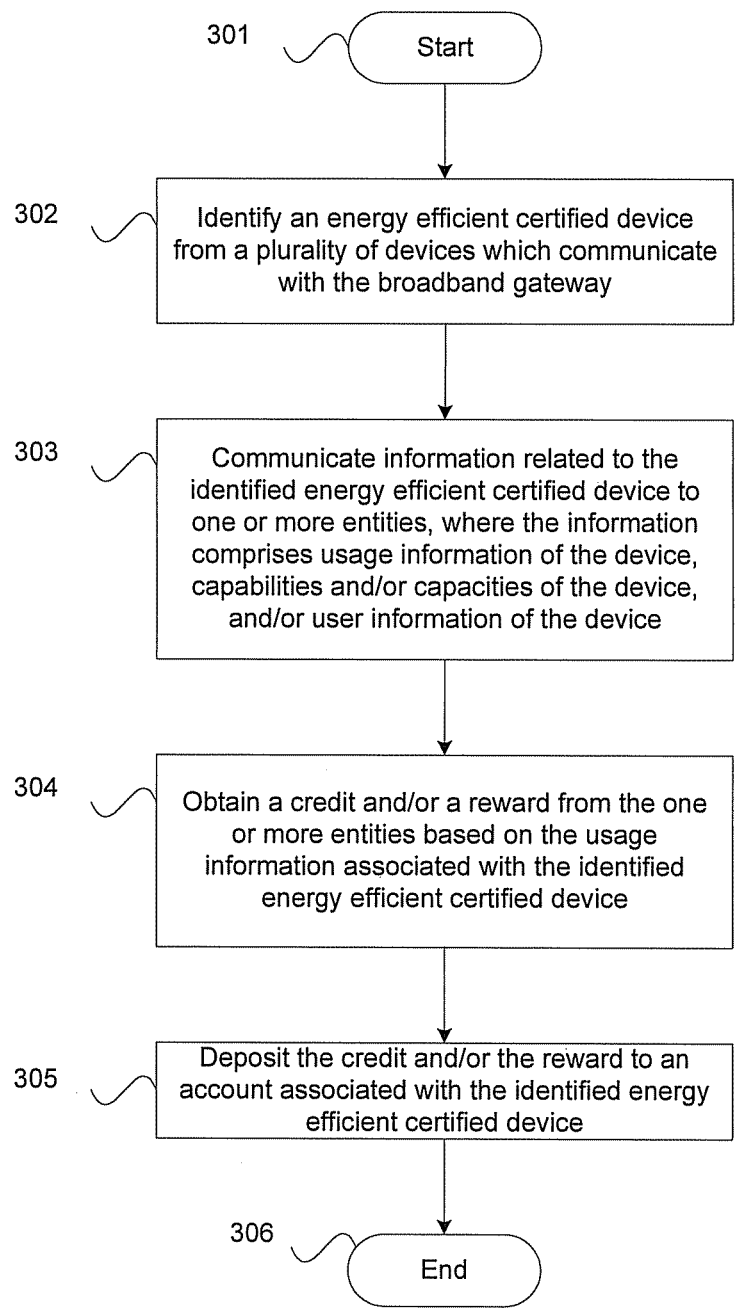
FIG. 3 is a flow chart illustrating exemplary steps for recognizing energy efficient certified devices through a gateway, in accordance with an embodiment of the invention.

FIG. 3 is a flow chart illustrating exemplary steps for recognizing energy efficient certified devices through a gateway, in accordance with an embodiment of the invention. Referring to FIG. 3, the exemplary steps start at step 301. In step 302, the broadband gateway 102 (FIG. 1A) may be operable to identify an energy efficient certified device such as the device 104a from a plurality of devices 104 (FIG. 1A) which may communicate with the broadband gateway 102. In step 303, based on the identification, the broadband gateway 102 may be operable to communicate information related to the identified energy efficient certified device 104a upstream to one or more entities such as, for example, the SP 172 and/or the entity 170 (FIG. 1C). The information related to the identified energy efficient certified device 104a may comprise, for example, usage information of the device 104a, capabilities and/or capacities of the device 104a, and/or user information of the device 104a. In step 304, the broadband gateway 102 may be operable to obtain a credit and/or a reward from the one or more entities such as the SP 172 and/or the entity 170, based on the usage information associated with the identified energy efficient certified device 104a. For example, the credit/reward may have been awarded based on energy savings resulting from operating the identified energy efficient certified device 104a in an energy-saving mode. In step 305, the broadband gateway 102 may be operable to deposit credit and/or the reward in an account such as the user account 114 (FIG. 1A) associated with the identified energy efficient certified device 104a. The exemplary steps may proceed to the end step 306.

Figure 4:
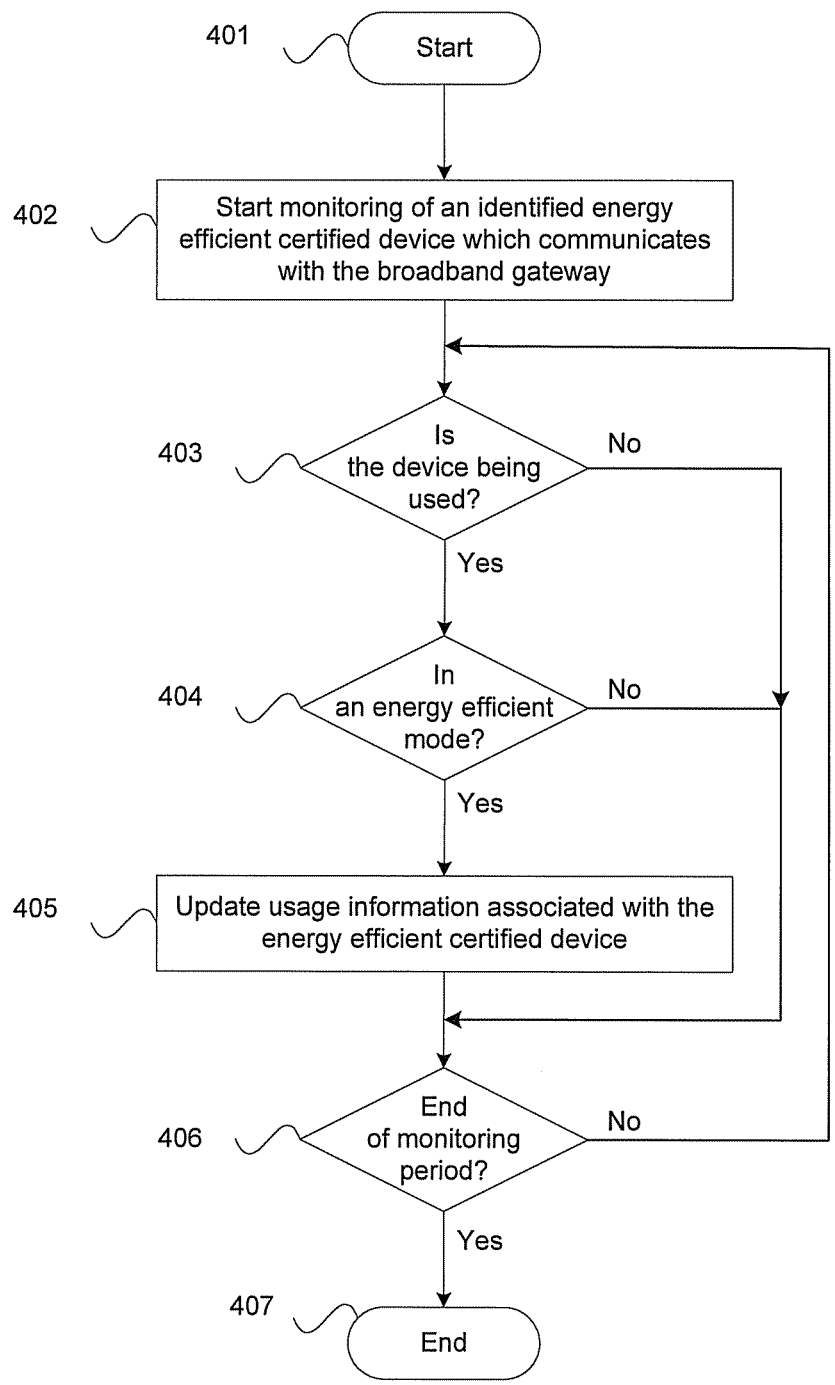
FIG. 4 is a flow chart illustrating exemplary steps for monitoring usage information associated with an energy efficient certified device, in accordance with an embodiment of the invention.

FIG. 4 is a flow chart illustrating exemplary steps for monitoring usage information associated with an energy efficient certified device, in accordance with an embodiment of the invention. Referring to FIG. 4, the exemplary steps start at step 401. In step 402, the broadband gateway 102 (FIG. 1A) may be operable to start monitoring of an identified energy efficient certified device such as the device 104a which may communicate with the broadband gateway 102. In step 403, whether the device 104a (FIG. 1A) is actually being used is determined. In instances when the device 104a is actually being used, the exemplary steps may proceed to step 404. In step 404, whether the device 104a is operating in an energy efficient mode is determined. In instances when the device 104a is configured to operate in an energy efficient mode, the exemplary steps may proceed to step 405. In step 405, the broadband gateway 102 may be operable to update usage information associated with the device 104a. In step 406, an end of monitoring period is determined. In instances when an end of monitoring period is reached, the exemplary steps may proceed to the end step 407. In step 403, in instances when the device 104a is not being used, the exemplary steps may proceed to step 406. In step 404, in instances when the device 104a is not configured to operate in an energy efficient mode, the exemplary steps may proceed to step 406. In step 406, in instances when an end of monitoring period is not reached, the exemplary steps may proceed to step 403.

In various embodiments of the invention, a broadband gateway 102, 200, (FIG. 2), which enables communication with a plurality of devices 104a-104d and handles at least one physical layer connection to at least one corresponding network access service provider, may be operable to identify an energy efficient certified device such as the device 104a from the plurality of devices 104a-104d. In this regard, for example, the at least one physical layer connection may comprise a plurality of physical layer connections 230a-230b (FIG. 2) and the at least one corresponding network access service provider may comprise a plurality of corresponding network access service providers 220a-220b (FIG. 2). Each of the plurality of physical layer connections 230a-230b may correspond to a respective one of the plurality of corresponding network access service providers 220a-220b.

The broadband gateway 102 may be operable to communicate Information related to the identified energy efficient certified device 104a to one or more entities such as the entity 170. The information related to the energy efficient certified device 104a may comprise, for example, usage information of the device 104a, capabilities and/or capacities of the device 104a, and/or user information of the device 104a. In this regard, the broadband gateway 102 may acquire the usage information of the energy efficient certified device 104a by monitoring whether the device 104a is actually being used and/or is operating in an energy efficient mode, for example. In an exemplary embodiment of the invention, the identified energy efficient certified device 104a may comprise an energy efficient device that is certified by one or more governmental agencies and/or one or more other entities that may be approved or have authority to certify devices as being energy efficiency compliant. In an exemplary embodiment of the invention, an identified energy efficient certified device may be, for example, an energy star certified device such as the device 104a and/or a California energy efficient device such as the device 104d.

In an exemplary embodiment of the invention, the broadband gateway 102 may be operable to obtain a credit and/or a reward from the one or more entities such as the entity 170 based on the usage information of the energy efficient certified device 104a. The credit and/or the reward may be deposited by the broadband gateway 102 to an account 114 associated with the device 104a.

During interactions and/or communications between the broadband gateway 102 and the energy efficient certified device 104a for the identification for the energy efficient certified device 104a, the broadband gateway 102 may be operable to utilize one or more specific protocols. In this regard, for example, the one or more specific protocols may comprise one or more device discovering protocols, one or more signaling protocols, one or more control protocols and/or one or more messaging protocols.

In an exemplary embodiment of the invention, the one or more entities such as the entity 170 may manage generation and/or distribution of power in a power grid or smart grid.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for recognizing energy efficient certified devices through a gateway.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a broadband gateway that enables communication with a plurality of devices, wherein said broadband gateway is operable to handle at least one physical layer connection to at least one corresponding network access service provider:
determining that at least one of said plurality of devices is an energy efficient certified device;
receiving information related to said at least one of said plurality of devices determined to be an energy efficient certified device;
modifying the received information to prevent disclosure of identifying, sensitive or confidential information; and
communicating the modified information to one or more entities via said at least one physical layer connection.

2. The method according to claim 1, wherein said at least one physical layer connection comprises a plurality of physical layer connections and said at least one corresponding network access service provider comprises a plurality of corresponding network access service providers, and each of said plurality of physical layer connections corresponds to a respective one of said plurality of corresponding network access service providers.

3. The method according to claim 1, wherein said received information comprises usage information of said at least one of said plurality of devices determined to be an energy efficient certified device, capabilities or capacities of said at least one of said plurality of devices determined to be an energy efficient certified device, user information of said at least one of said plurality of devices determined to be an energy efficient certified device, or any combination thereof.

4. The method according to claim 3, comprising acquiring said usage information by monitoring whether said at least one of said plurality of devices determined to be an energy efficient certified device is operating in an energy efficient mode.

5. The method according to claim 1, comprising obtaining a credit, a reward, or both from said one or more entities based on usage information of said at least one of said plurality of devices determined to be an energy efficient certified device.

6. The method according to claim 5, comprising depositing said credit, said reward, or both to an account associated with said at least one of said plurality of devices determined to be an energy efficient certified device.

7. The method according to claim 1, comprising utilizing one or more specific protocols during communications between said broadband gateway and said plurality of devices for said determination that at least one of said plurality of devices is an energy efficient certified device.

8. The method according to claim 7, wherein said one or more specific protocols comprise one or more device discovering protocols, one or more signaling protocols, one or more control protocols, one or more messaging protocols, or any combination thereof.

9. The method according to claim 1, wherein said one or more entities manage generation of power, distribution of power, or both in a power grid.

10. The method of claim 1, wherein modifying the received information comprises encrypting the received information.

11. The method of claim 1, wherein modifying the received information comprises deleting a portion of the received information.

12. A system for communication, the system comprising:
one or more processors, one or more circuits, or any combination thereof for use in a broadband gateway that enables communication with a plurality of devices, wherein said broadband gateway is operable to handle at least one physical layer connection to at least one corresponding network access service provider, and said one or more processors, one or more circuits, or any combination thereof are operable to:
determine that at least one of said plurality of devices is an energy efficient certified device;
receive information related to said at least one of said plurality of devices determined to be an energy efficient certified device;
modify the received information to prevent disclosure of identifying, sensitive or confidential information; and
communicate the modified information related to said at least one of said plurality of devices determined to be an energy efficient certified device to one or more entities via said at least one physical layer connection.

13. The system according to claim 12, wherein said at least one physical layer connection comprises a plurality of physical layer connections and said at least one corresponding network access service provider comprises a plurality of corresponding network access service providers, and each of said plurality of physical layer connections corresponds to a respective one of said plurality of corresponding network access service providers.

14. The system according to claim 12, wherein said received information comprises usage information of said at least one of said plurality of devices determined to be an energy efficient certified device, capabilities, capacities, or both of said at least one of said plurality of devices determined to be an energy efficient certified device, or user information of said at least one of said plurality of devices determined to be an energy efficient certified device.

15. The system according to claim 14, wherein said one or more processors, one or more circuits, or any combination thereof are operable to acquire said usage information by monitoring whether said energy efficient certified device is operating in an energy efficient mode.

16. The system according to claim 12, wherein said one or more processors, one or more circuits, or any combination thereof are operable to obtain a credit, a reward, or both from said one or more entities based on usage information of said at least one of said plurality of devices determined to be an energy efficient certified device.

17. The system according to claim 16, wherein said one or more processors, one or more circuits, or any combination thereof are operable to deposit said credit, said reward, or both to an account associated with said at least one of said plurality of devices determined to be an energy efficient certified device.

18. The system according to claim 12, wherein said one or more processors, one or more circuits, or any combination thereof are operable to utilize one or more specific protocols during communications between said broadband gateway and said plurality of devices for said determination that at least one or more of said plurality of devices is an energy efficient certified device.

19. The system according to claim 18, wherein said one or more specific protocols comprise one or more device discovering protocols, one or more signaling protocols, one or more control protocols, one or more messaging protocols, or any combination thereof.

20. A method for communication, the method comprising:
in a broadband gateway that enables communication with a plurality of devices, wherein said broadband gateway is operable to handle at least one physical layer connection to at least one corresponding network access service provider:
identifying an energy efficient certified device from said plurality of devices;
modifying information related to said energy efficient certified device to prevent disclosure of identifying, sensitive or confidential information; and
communicating the modified information to one or more entities via said at least one physical layer connection.

* * * * *